(12) United States Patent
Chang et al.

(10) Patent No.: US 10,185,099 B2
(45) Date of Patent: Jan. 22, 2019

(54) OPTICAL FIBER CONNECTOR

(71) Applicant: Gloriole Electroptic Technology Corp., Kaohsiung (TW)

(72) Inventors: Ming-Hua Chang, Kaohsiung (TW); Tung-Chun Huang, Hsinchu (TW)

(73) Assignee: GLORIOLE ELECTROPTIC TECHNOLOGY CORP., Kaohsiung (TW)

( * ) Notice: Subject to any disclaimer, the term of this patent is extended or adjusted under 35 U.S.C. 154(b) by 0 days.

(21) Appl. No.: 15/487,962

(22) Filed: Apr. 14, 2017

(65) Prior Publication Data

US 2017/0299818 A1 Oct. 19, 2017

(30) Foreign Application Priority Data

Apr. 18, 2016 (TW) .............................. 105205357 U

(51) Int. Cl.
*G02B 6/36* (2006.01)
*G02B 6/38* (2006.01)

(52) U.S. Cl.
CPC ......... *G02B 6/3871* (2013.01); *G02B 6/3825* (2013.01); *G02B 6/3874* (2013.01); *G02B 6/3893* (2013.01)

(58) Field of Classification Search
CPC .............................. G02B 6/3893; G02B 6/3898
See application file for complete search history.

(56) References Cited

U.S. PATENT DOCUMENTS

| | | | | |
|---|---|---|---|---|
| 8,465,317 B2* | 6/2013 | Gniadek | ............ | H01R 13/6335 439/344 |
| 8,641,293 B2* | 2/2014 | Lin | ...................... | G02B 6/3893 385/53 |
| 8,998,505 B2* | 4/2015 | Motofuji | .................. | G02B 6/36 385/78 |
| 9,461,404 B2* | 10/2016 | Yu | .......................... | G02B 6/4284 |
| 9,568,689 B2* | 2/2017 | Nguyen | .................. | G02B 6/389 |
| 9,588,305 B2* | 3/2017 | Seki | ....................... | G02B 6/387 |
| 9,599,778 B2* | 3/2017 | Wong | .................... | G02B 6/3825 |
| 9,739,955 B2* | 8/2017 | Lee | ......................... | G02B 6/3893 |
| 2003/0063862 A1* | 4/2003 | Fillion | ................. | G02B 6/3825 385/53 |
| 2013/0216188 A1* | 8/2013 | Lin | ...................... | G02B 6/3893 385/77 |
| 2013/0323949 A1* | 12/2013 | De Dios Martin | ........................ | H01R 13/6272 439/160 |

* cited by examiner

*Primary Examiner* — Rhonda S Peace
(74) *Attorney, Agent, or Firm* — Muncy, Geissler, Olds & Lowe, P.C.

(57) ABSTRACT

An optical fiber connector includes a housing unit and an operating unit. The housing unit includes a resilient retaining arm member. The operating unit includes a pivot seat, a hook member pivotally connected to the pivot seat, rotatable relative to the pivot seat, and having a front end that abuts against the resilient retaining arm member, and an operating rod pivotally connected to a rear end of the hook member. When the operating rod is pulled rearwardly, the hook member is driven to pivotally rotate relative to the pivot seat such that, the hook member presses and moves the rear end of the resilient retaining arm member, so as to deform the resilient retaining arm member, thereby allowing for removal of an adapter from the optical fiber connector.

6 Claims, 8 Drawing Sheets

OPTICAL FIBER CONNECTOR

CROSS-REFERENCE TO RELATED APPLICATION

This application claims priority of Taiwanese Patent Application No. 105205357, filed on Apr. 18, 2016.

FIELD

The disclosure relates to optical fiber equipment, and more particularly to an optical fiber connector.

BACKGROUND

There are different kinds of optical fiber connectors, in which Lucent Connector (LC) is suitable with a high-density disposition.

As shown in FIG. 1, a conventional optical fiber connector 1 includes a housing unit 11 having a receiving space 100, a fiber ferrule unit 12 received inside the receiving space 100, and an operating unit 13 removably connected to the housing unit 11. The housing unit 11 has a main body 111 extending in a front-rear direction, and a resilient retaining arm portion 112 connected to the main body 111. The main body 111 has two engaging holes 113 (only one is visible) extending in a direction which is perpendicular to the front-rear direction, and disposed for engagement with the fiber ferrule unit 12.

The operating unit 13 includes a sleeve member 131 sleeved onto the housing unit 11, a tail cover 132 extending rearwardly from a rear end of the housing unit 11, and an operating rod 133 extending rearwardly from the sleeve member 131. The sleeve member 131 has a main body portion 134, and a hook member 135 connected to the main body portion 134, and having a front end that abuts against the resilient retaining arm portion 112 of the housing unit 11. The operating rod 133 is disposed for a user to apply a pushing force to mount the conventional optical fiber connector 1 to a required position.

However, when removing the conventional optical fiber connector 1 from an adapter (not shown), the user requires to press the resilient retaining arm portion 112 toward the main body 111. With such configuration, when an operating space is small, the user might not be able to press the resilient retaining arm portion 112 to remove the conventional optical fiber connector 1.

SUMMARY

Therefore, the object of the disclosure is to provide an optical fiber connector that is operable in a small operating space.

According to the disclosure, the optical fiber connector is adapted for connection with an adapter, and includes a housing unit, a fiber ferrule unit, a tail cover unit, and an operating unit. The housing unit includes a main body extending in a front-rear direction, and having a receiving space, and a resilient retaining arm member connected to an outer surface of the main body and adapted to retain the adapter on the main body. The fiber ferrule unit is disposed inside the receiving space. The tail cover unit is sleeved on a rear end of the housing unit. The operating unit includes a sleeve member sleeved onto a junction between the housing unit and the tail cover unit, a pivot seat fixedly connected to the sleeve member, a hook member pivotally connected to the pivot seat, rotatable relative to the pivot seat about an axis, which is perpendicular to the front-rear direction, and having a front end that abuts against the resilient retaining arm member, and an operating rod pivotally connected to a rear end of the hook member. The operating rod is movable relative to the pivot seat in the front-rear direction to rotate the hook member relative to the pivot seat about the axis. When the operating rod is pulled rearwardly by a user, the hook member is driven to pivotally rotate relative to the pivot seat about the axis such that, the hook member presses and moves the rear end of the resilient retaining arm member, so as to deform the resilient retaining arm member, thereby allowing for removal of the adapter from the optical fiber connector.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
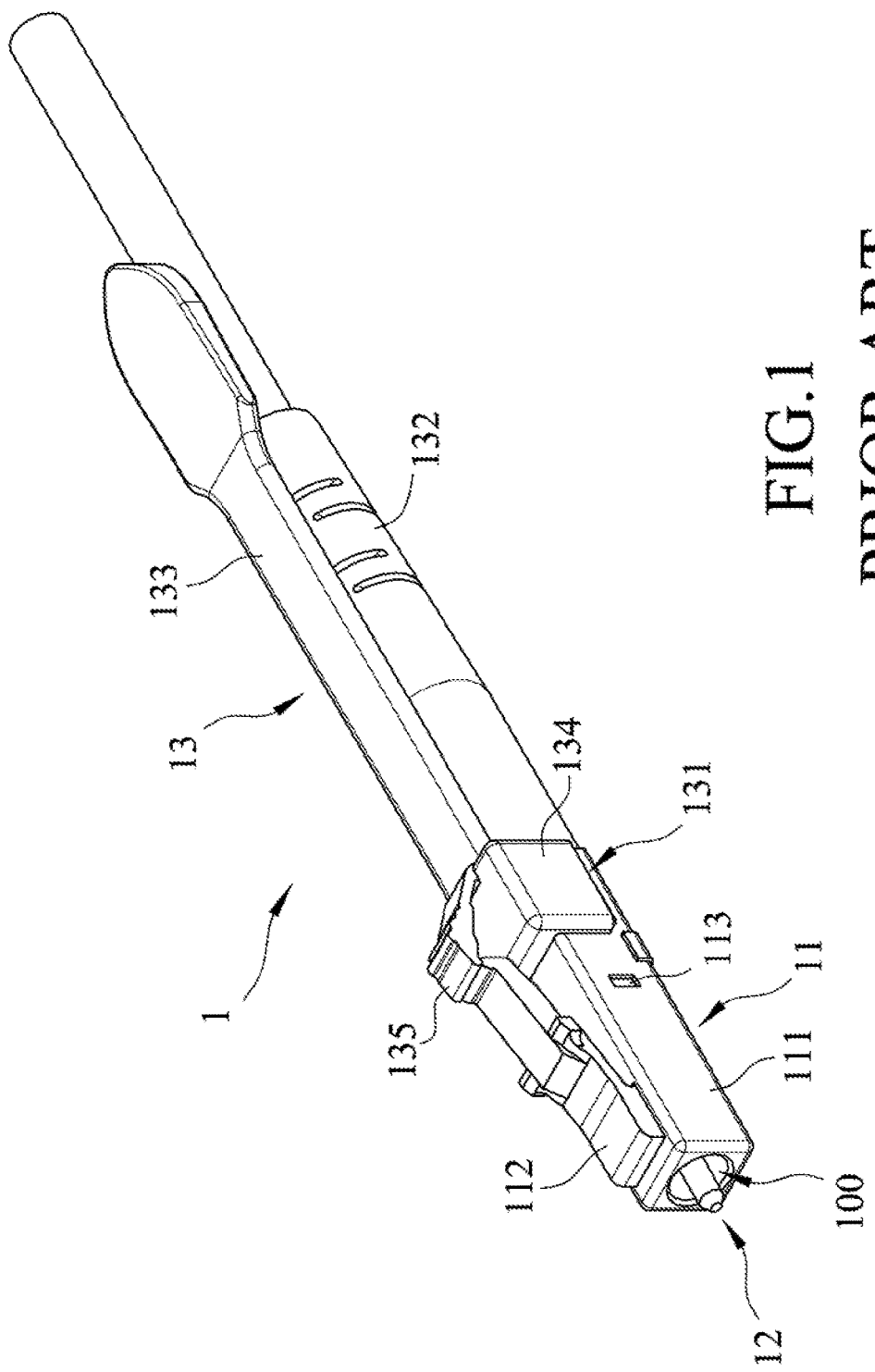
FIG. 1 is a perspective view of a conventional optical fiber connector.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
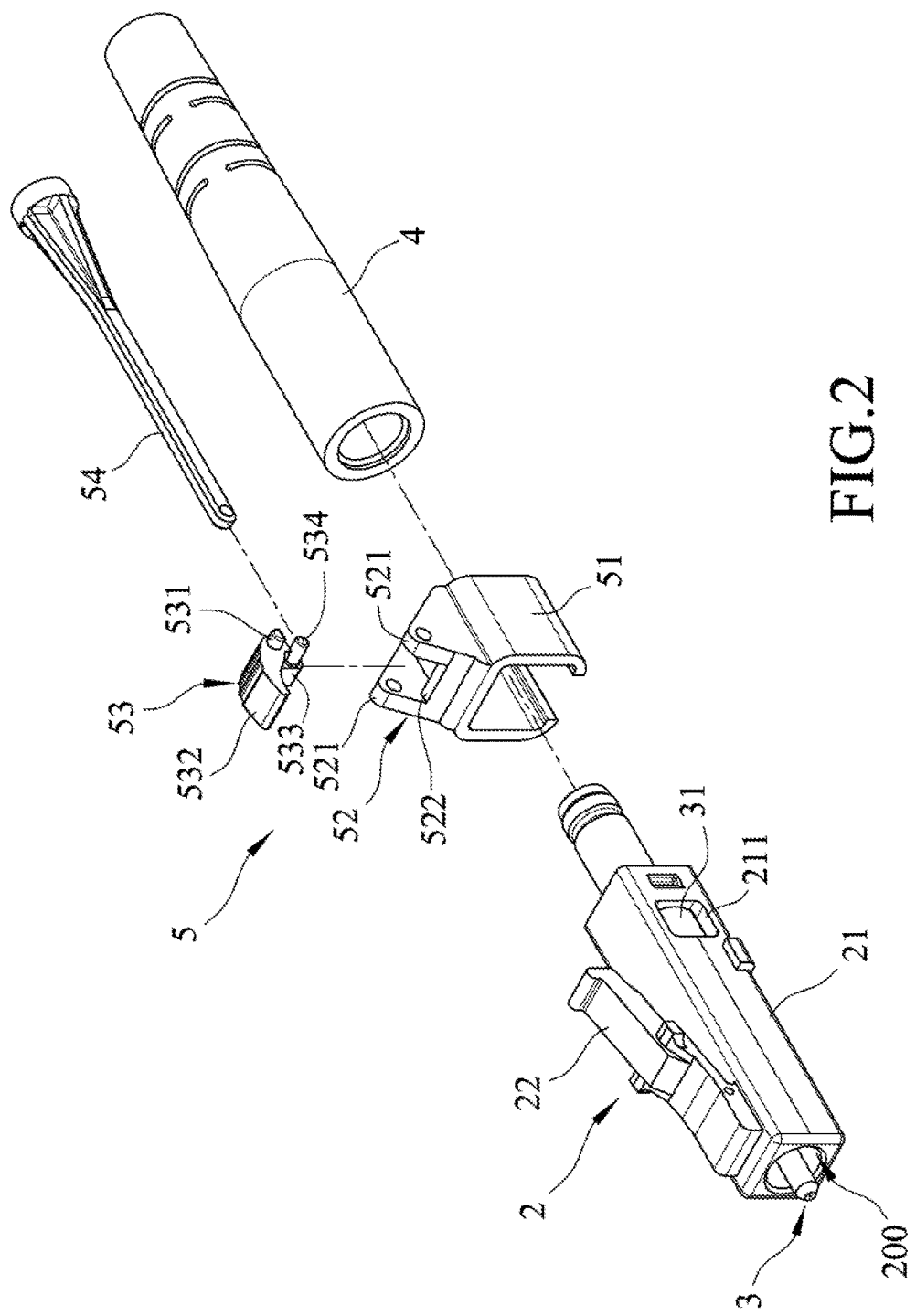
FIG. 2 is an exploded perspective view of a first embodiment of an optical fiber connector according to the disclosure.

As shown in FIG. 2, the first embodiment of an optical fiber connector according to the disclosure is adapted for connection with an adapter 9, and includes a housing unit 2, a fiber ferrule unit 3, a tail cover unit 4 and an operating unit 5.

Figure 3:
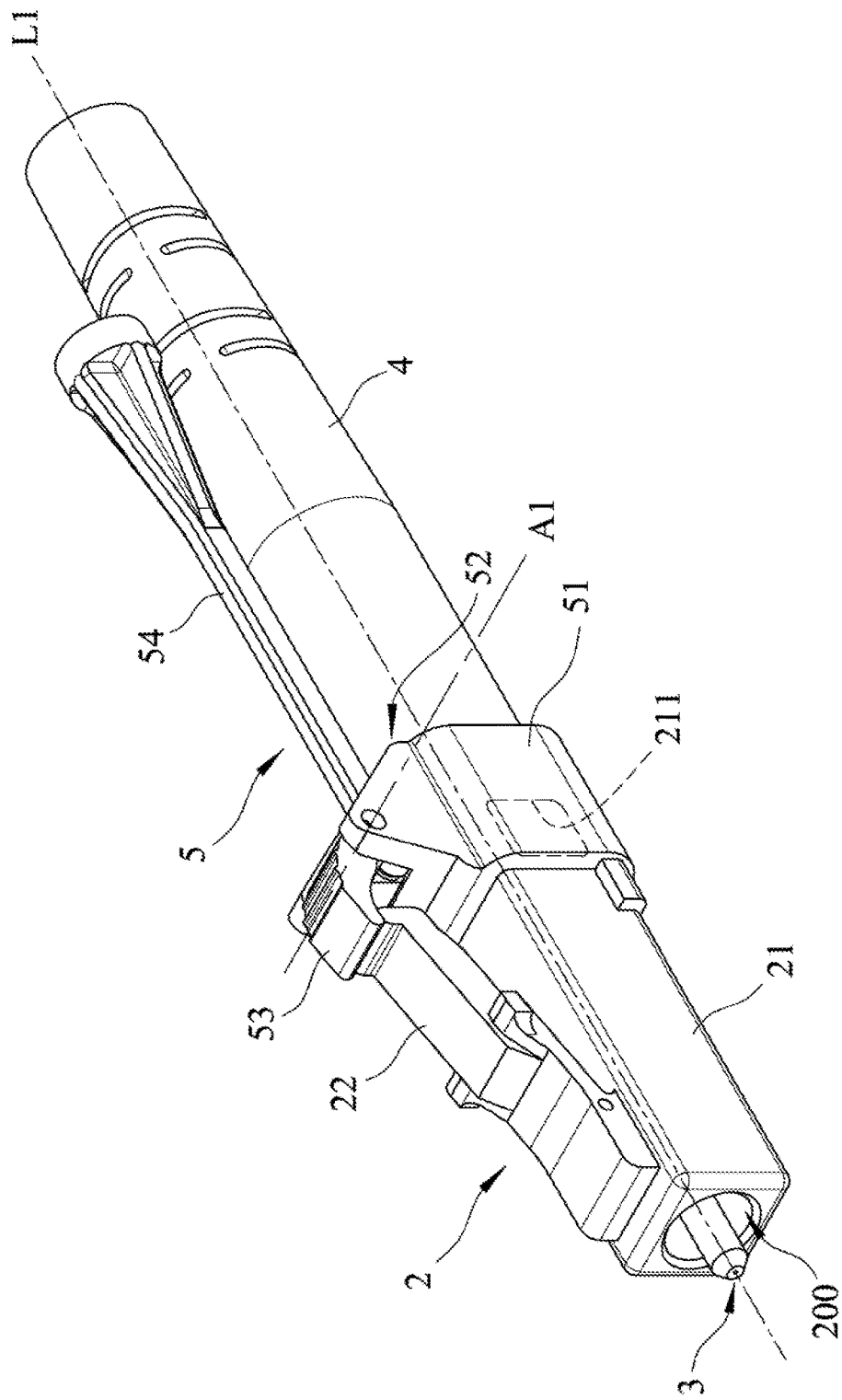
FIG. 3 is a perspective view of the first embodiment.
Figure 4:
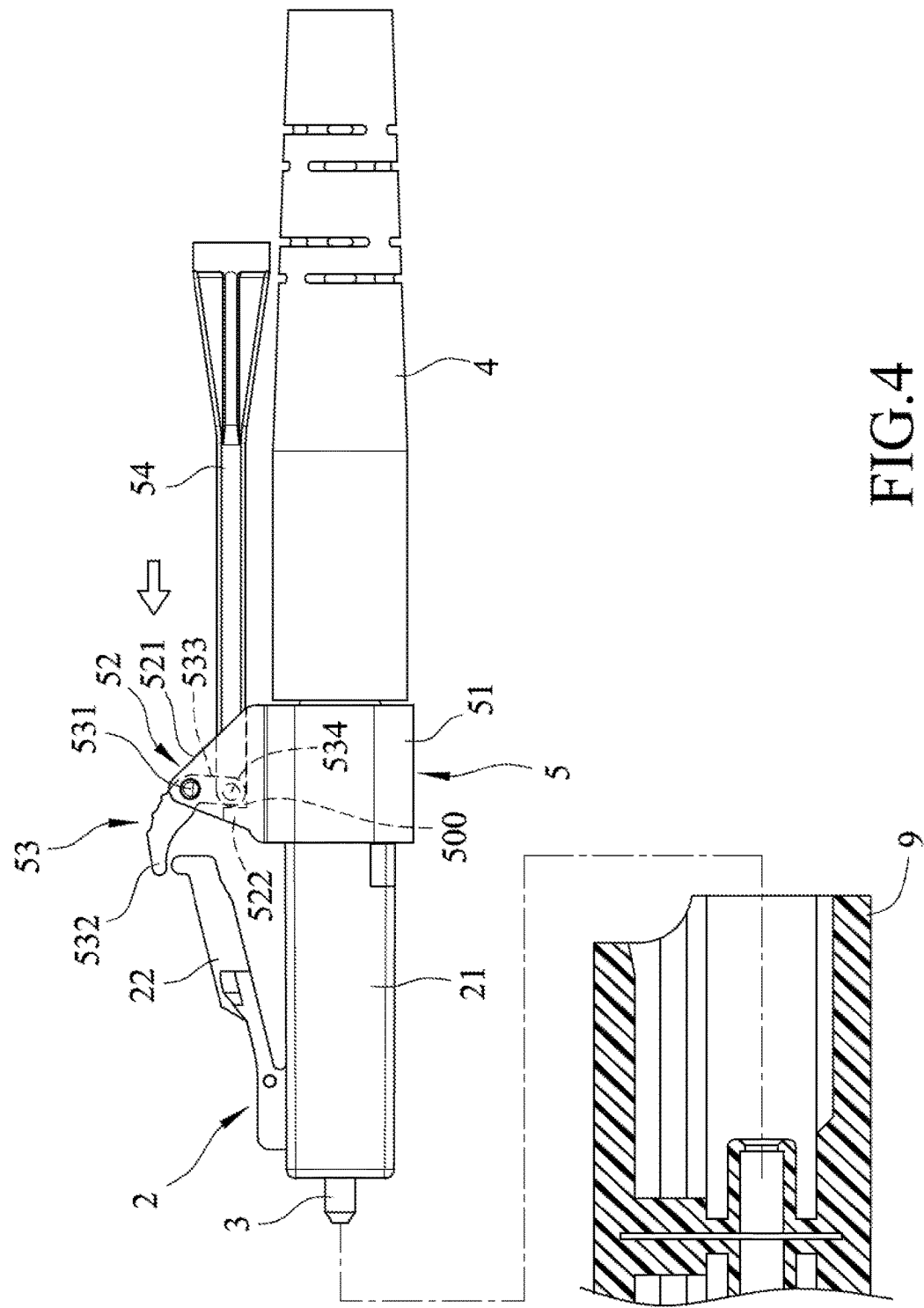
FIG. 4 is a schematic side view of the first embodiment and an adapter, which illustrates that a front end of a hook member is separated from a resilient retaining arm member.

Referring to FIGS. 2, 3 and 4, in this embodiment, the housing unit 2 includes a main body 21 extending in a front-rear direction (L1), and having a receiving space 200, and a resilient retaining arm member 22 connected to an outer surface of the main body 21, and adapted to retain the adapter 9 on the main body 21. The main body 21 has a surrounding wall formed with two engaging holes 211 (only one is visible) that extend along an axis (A1) which is perpendicular to the front-rear direction (L1). The fiber ferrule unit 3 (see FIG. 4) has two insert portions 31 (only one is visible in FIG. 2) respectively and resiliently engaging the engaging holes 211 so as to be fixedly disposed inside the receiving space 200 for being connected to an optical fiber. The tail cover unit 4 is sleeved on a rear end of the housing unit 2, extends in the front-rear direction (L1), and has a space communicated with the receiving space 200 for disposition of the optical fiber. Since the structure of the fiber ferrule unit 3 and the tail cover unit 4 are well-known in the art, details thereof are thereby omitted herein for the sake of brevity.

In this embodiment, the operating unit 5 includes a sleeve member 51 sleeved onto a junction between the housing unit 2 and the tail cover unit 4, a pivot seat 52 fixedly connected to the sleeve member 51, a hook member 53 pivotally connected to the pivot seat 52, rotatable relative to the pivot seat 52 about the axis (A1), and having a front end that abuts against the resilient retaining arm member 22, and an operating rod 54 pivotally connected to a rear end of the hook member 53. The pivot seat 52 has two side wall portions 521 spaced apart from each other along the axis (A1), and extending from the sleeve member 51, and a stop wall portion 522 connected between the side wall portions 521, and located at a front end of the pivot seat 52.

The side wall portions 521 and the stop wall portion 522 corporately define a rotating space 500 for disposition of the hook member 53. The hook member 53 has two pivot rod portions 531 (only one is visible) respectively and rotatably extending into the side wall portions 521 of the pivot seat 52 along the axis (A1), a front swing arm portion 532 disposed in front of the pivot rod portions 531, a lateral swing arm portion 533 extending from a rear end of the front swing arm portion 532 in a direction away from the pivot rod portions 531 and toward the sleeve member 51, and a coupling rod 534 extending from the lateral swing arm portion 533 and along a direction parallel to the axis (A1), and disposed in the rotating space 500. The operating rod 54 is pivotally connected to the coupling rod 534, and is movable relative to the pivot seat 52 in the front-rear direction (L1) to rotate the hook member 53 relative to the pivot seat 52 about the axis (A1). Since only one coupling rod 534 is provided, an assembling operation is simplified. The stop wall portion 522 of the pivot seat 52 is positioned such that the lateral swing arm portion 533 of the hook member 53 is pivotable forwardly until the lateral swing arm portion 533 comes into contact with the stop wall portion 522, so as to limit a rotating angle of the lateral swing arm portion 533.

Figure 5:
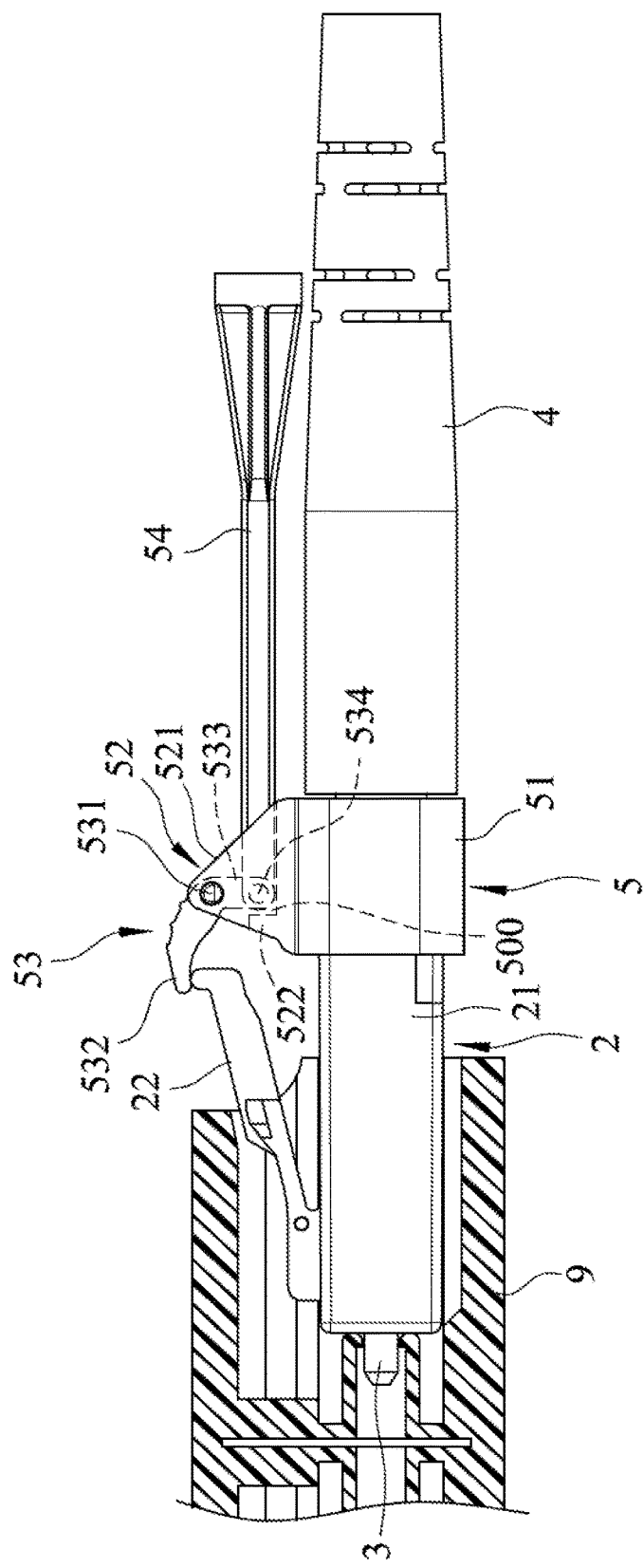
FIG. 5 is another schematic side view of the first embodiment and the adapter, which illustrates that the front end of the hook member abuts against the resilient retaining arm member and that the optical fiber connector is connected to the adapter.

Referring to FIGS. 4 and 5, to connect the optical fiber connector to the adapter 9, a user needs to hold the operating rod 54 and push the optical fiber connector toward the adapter 9. At the same moment, the hook member 53 is driven to pivotally rotate relative to the pivot seat 52 about the axis (A1) until the lateral swing arm portion 533 comes into contact with the stop wall portion 522. Hence, the front end of the hook member 53 is separated from the resilient retaining arm member 22. As the connection between the optical fiber connector and the adapter 9 is completed, the operation rod 54 is pulled rearwardly away from the stop wall portions 522 until the front end of the hook member 53 abuts against the resilient retaining arm member 22.

Figure 6:
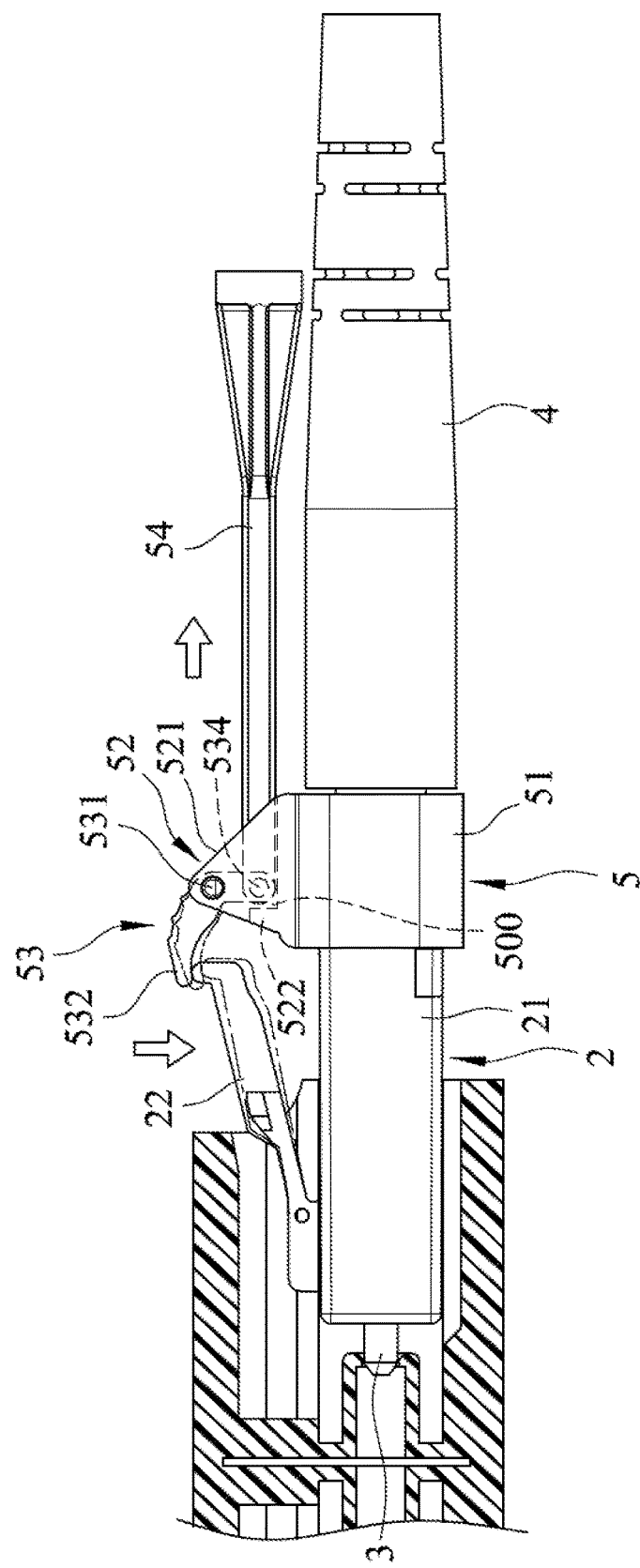
FIG. 6 is another schematic side view of the first embodiment, which illustrates that an operating rod is pulled to drive rotation of the hook member for separating the optical fiber connector from the adapter.

As shown in FIG. 6, to disconnect the optical fiber connector from the adapter 9, the user needs to further pull the operating rod 54 rearwardly, so that the hook member 53 presses and moves the rear end of the resilient retaining arm member 22 to deform the resilient retaining arm member 22, thereby allowing for removal of the adapter 9 from the optical fiber connector.

As such, with the configuration of the optical fiber connector, the user can easily connect the optical fiber connector to the adapter 9 or disconnect the optical fiber connector from the adapter 9 in a narrow operating space. Therefore, preservation of a spare space when building an optical fiber web is not required.

Figure 7:
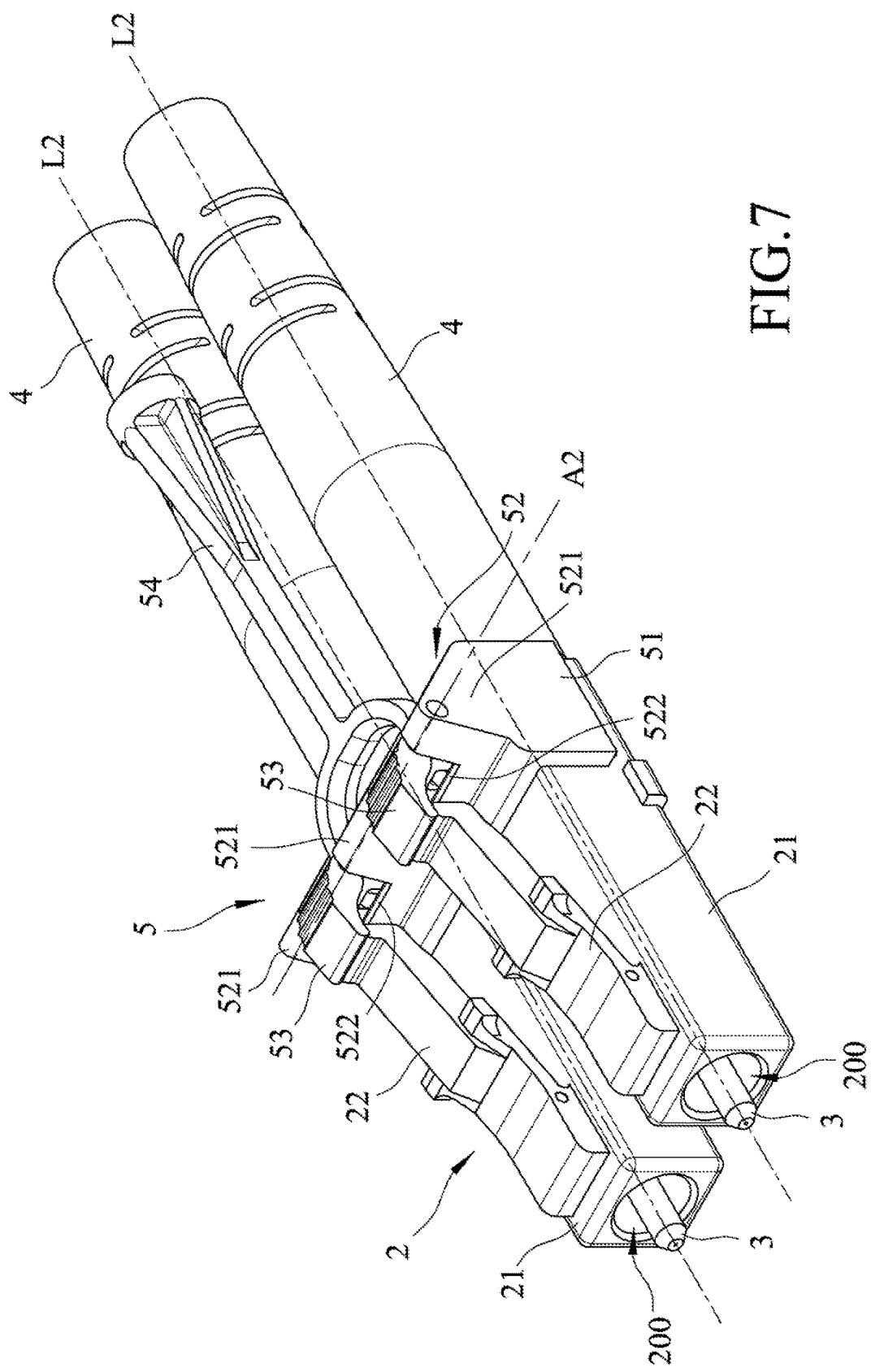
FIG. 7 is a perspective view of a second embodiment of the optical fiber connector according to the disclosure.
Figure 8:
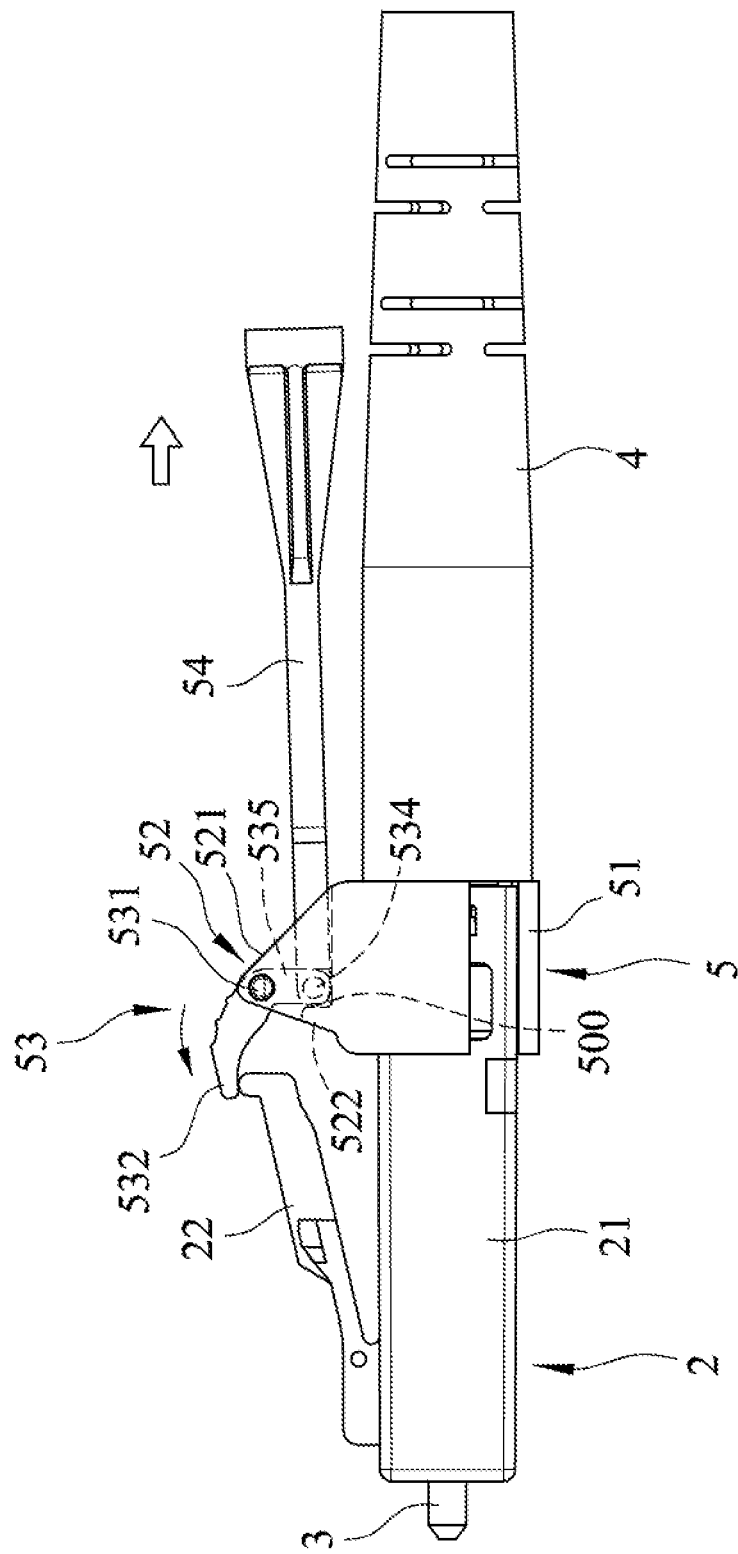
FIG. 8 is a schematic side view of the second embodiment.

Referring to FIGS. 7 and 8, the second embodiment of the optical fiber connector according to the disclosure has a structure similar to that of the first embodiment. The main difference between this embodiment and the previous embodiment resides in that, in this embodiment, the optical fiber connector includes two housing units 2, two fiber ferrule units 3, and two tail cover units 4. The housing units 2 are spaced apart from each other, and each of the housing units 2 includes a main body 21 extending in a front-rear direction (L2), and having a receiving space 200, and a resilient retaining arm member 22 connected to an outer surface of the main body 21, and adapted to retain an adapter 9 on the main body 21. The fiber ferrule units 3 are respectively disposed inside the receiving spaces 200 of the housing units 2. The tail cover units 4 are respectively sleeved on rear ends of the housing units 2. The operating unit 5 includes a sleeve member 51 sleeved onto a junction between the housing units 2 and the tail cover units 4, a pivot seat 52 fixedly connected to the sleeve member 51, two hook members 53 spaced apart from each other, pivotally connected to the pivot seat 52, and rotatable relative to the pivot seat 52 about an axis (A2), which is perpendicular to the front-rear direction (L2), and an operating rod 54 pivotally connected to rear ends of the hook members 53.

The pivot seat 52 has three side wall portions 521 spaced apart from each other along the axis (A2), and extending from the sleeve member 51, and two stop wall portions 522 each being connected between two adjacent ones of the side wall portions 521, and located at a front end of the pivot seat 52. The stop wall portions 522 are spaced apart from and aligned with each other along the axis (A2). Each of the stop wall portions 522 and two corresponding ones of the side wall portions 521 corporately define a rotating space 500 for disposition a respective one of the hook members 53.

Each of the hook members 53 has a front end abutting against a respective one of the resilient retaining arm members 22, two pivot rod portions 531 (only one is visible) respectively and rotatably extending into the two corresponding ones of the side wall portions along the axis (A2), and pivotally connected to the pivot seat 52, a front swing arm portion 532 disposed in front of the pivot rod portions 531, a lateral swing arm portion 535 extending from a rear end of the front swing arm portion 532 in a direction away from the pivot rod portions 531 and toward the sleeve member 51, and a coupling rod 534 extending from the lateral swing arm portion 535 along a direction parallel to the axis (A2), and disposed in the rotating space 500 defined among a corresponding one of the stop wall portions 522 and the two corresponding ones of the side wall portions 521. The lateral swing arm portions 535 of the hook members 53 are respectively disposed in the rotating spaces 500.

The operating rod 54 is pivotally connected to the coupling rods 534 of the lateral swing arm portions 535 of the hook members 53, and is movable relative to the pivot seat 52 in the front-rear direction (L2) to rotate the hook members 53 relative to the pivot seat 52 about the axis (A2).

The stop wall portions 522 of the pivot seat 52 are positioned such that the lateral swing arm portions 535 of the hook members 53 are pivotable forwardly until the lateral swing arm portions 535 come into contact with the stop wall portions 522, respectively, so as to limit rotating angles of the lateral swing arm portions 535. The operating process of the second embodiment is similar to that of the first embodiment, and the only one difference is that, in this embodiment, the operating rod 54 can simultaneously drive the hook members 53.

The second embodiment offers another choice for the user, it should be noted that, since the first and second embodiments have same advantages, the first and second embodiments can be disposed at the same time when building the optical fiber web.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. An optical fiber connector adapted for connection with an adapter, comprising:
    a housing unit including a main body that extends in a front-rear direction, and that has a receiving space, and a resilient retaining arm member that is connected to an outer surface of said main body, and that is adapted to retain the adapter on said main body;
    a fiber ferrule unit disposed inside said receiving space;
    a tail cover unit sleeved on a rear end of said housing unit; and
    an operating unit including a sleeve member that is sleeved onto a junction between said housing unit and said tail cover unit, a pivot seat that is fixedly connected to said sleeve member, a hook member that is pivotally connected to said pivot seat, that is rotatable relative to said pivot seat about an axis, which is perpendicular to the front-rear direction, and that has a front end abutting against said resilient retaining arm member, and an operating rod that is pivotally connected to a rear end of said hook member, said operating rod being movable relative to said pivot seat in the front-rear direction to rotate said hook member relative to said pivot seat about the axis;
    wherein said operating rod of said operating unit is spaced apart from said tail cover unit; wherein when said operating rod is pulled rearwardly by a user, said hook member is driven to pivotally rotate relative to said pivot seat about the axis such that, said hook member presses and moves a rear end of said resilient retaining arm member, so as to deform said resilient retaining arm member, thereby allowing for removal of the adapter from said optical fiber connector;
    wherein said pivot seat has two side wall portions spaced apart from each other along the axis, and extending from said sleeve member, and a stop wall portion connected between said side wall portions, and located at a front end of said pivot seat;
    wherein said side wall portions and said stop wall portion corporately define a rotating space for disposition of said hook member;
    wherein said stop wall portion is positioned such that a portion of said hook member is pivotable forwardly until said portion of said hook member comes into contact with said stop wall portion, so as to limit a rotating angle of said hook member; and
    wherein said stop wall portion is located between said portion of said hook member and a space between said resilient retaining arm member and said main body of said housing unit for preventing said hook member from entering said space between said resilient retaining arm member and said main body of said housing unit.

2. The optical fiber connector as claimed in claim 1, wherein:
    said hook member has two pivot rod portions respectively and rotatably extending into said side wall portions of said pivot seat along the axis, a front swing ami portion disposed in front of said pivot rod portions, a lateral swing arm portion extending from a rear end of said front swing arm portion in a direction away from said pivot rod portions and toward said sleeve member, and a coupling rod extending from said lateral swing atm portion and along a direction parallel to the axis, and disposed in said rotating space; and
    said operating rod is pivotally connected to said coupling rod.

3. The optical fiber connector as claimed in claim 1, wherein said main body of said housing unit has a surrounding wall formed with two engaging holes that extend along the axis, and said fiber ferrule unit engages said engaging holes.

4. An optical fiber connector adapted for connection with two adapters, comprising:
    two housing units spaced apart from each other, each of said housing units including a main body that extends in a front-rear direction, and that has a receiving space, and a resilient retaining arm member that is connected to an outer surface of a respective one of said main bodies, and that is adapted to retain a respective one of the adapters on the respective one of said main bodies;
    two fiber ferrule units respectively disposed inside said receiving spaces;
    two tail cover units respectively sleeved on rear ends of said housing units; and
    an operating unit including a sleeve member that is sleeved onto a junction between said housing units and said tail cover units, a pivot seat that is fixedly connected to said sleeve member, two hook members that are spaced apart from each other, that are pivotally connected to said pivot seat, and that are rotatable relative to said pivot seat about an axis, which is perpendicular to the front-rear direction, and an operating rod that is pivotally connected to rear ends of said hook members, each of said hook members having a front end that abuts against a respective one of said resilient retaining arm members, said operating rod being movable relative to said pivot seat in the front-rear direction to rotate said hook members relative to said pivot seat about the axis;
    wherein each of said housing units receives a respective one of said fiber ferrule units, and cooperates with a respective one of said tail cover units to serve as a connecting assembly for the respective one of said fiber ferrule units;

wherein said operating rod of said operating unit is spaced apart from said tail cover units;

wherein when said operating rod is pulled rearwardly by a user, said hook members are driven to pivotally rotate relative to said pivot seat about the axis such that, said hook members respectively press and move said resilient retaining arm members of said housing units, so as to respectively deform said resilient retaining arm members, thereby allowing for removal of the adapters from said optical fiber connector;

wherein said pivot seat has three side wall portions spaced apart from each other along the axis, and extending from said sleeve member, and two stop wall portions each being connected between two adjacent ones of said side wall portions, and located at a front end of said pivot seat, said stop wall portions being spaced apart from and aligned with each other along the axis;

wherein each of said stop wall portions and two corresponding ones of said side wall portions corporately define a rotating space for disposition of a respective one of said hook members;

wherein each of said stop wall portions is positioned such that a portion of said corresponding hook member is pivotable forwardly until said portion of said corresponding hook member comes into contact with said stop wall portion, so as to limit a rotating angle of said corresponding hook member; and wherein each of said stop wall portion is located between said portion of said corresponding hook member and a space between said corresponding resilient retaining arm member and said main body of said corresponding housing unit for preventing said corresponding hook member from entering said space between said corresponding resilient retaining arm member and said main body of said corresponding housing unit.

5. The optical fiber connector as claimed in claim 4, wherein:

each of said hook members has two pivot rod portions respectively and rotatably extending into said two corresponding ones of said side wall portions along the axis, and pivotally connected to said pivot seat, a front swing arm portion disposed in front of said pivot rod portions, a lateral swing arm portion extending from a rear end of said front swing arm portion in a direction away from said pivot rod portions and toward said sleeve member, and a coupling rod extending from said lateral swing arm portion along a direction parallel to the axis, and disposed in said rotating space defined among a corresponding one of said stop wall portions and said two corresponding ones of said side wall portions;

said lateral swing arm portions of said hook members are respectively disposed in said rotating spaces; and said operating rod is pivotally connected to said coupling rod of said hook members.

6. The optical fiber connector as claimed in claim 4, wherein said main body of each of said housing units has a surrounding wall formed with two engaging holes that extend along the axis, and each of said fiber ferrule units engages said engaging holes of a corresponding one of said housing units.

* * * * *